F. A. STAPLES.
ARTIFICIAL BAIT.
APPLICATION FILED JULY 13, 1911.

1,019,926.

Patented Mar. 12, 1912.

Witnesses
M. M. Martin
Jas. A. Anderson

Inventor
F. A. Staples
By E. H. Bates
Attorney

COLUMBIA PLANOGRAPH CO., WASHINGTON, D. C.

UNITED STATES PATENT OFFICE.

FRANK A. STAPLES, OF SAN FRANCISCO, CALIFORNIA.

ARTIFICIAL BAIT.

1,019,926.   Specification of Letters Patent.   Patented Mar. 12, 1912.

Application filed July 13, 1911. Serial No. 638,404.

*To all whom it may concern:*

Be it known that I, FRANK A. STAPLES, a citizen of the United States, residing at San Francisco, in the county of San Francisco and State of California, have invented certain new and useful Improvements in Artificial Bait, of which the following is a specification.

This invention has relation to improvements in artificial bait, providing an imitation of a minnow, and it consists in the novel construction, combination and arrangements of parts, of which it is composed, all as will be hereinafter more fully described in the specification and particularly pointed out in the appended claim.

In constructing my device, the body portion is formed to represent a fish, or minnow having the usual hook attached at the tail end thereof and the line connected at the head and in combination with said body I provide a light triangular frame carrying a lure on either side of said body as well as a detachable elongated sinker further hereinafter explained.

The annexed drawing, to which reference is made, fully illustrates my invention, in which—

Figure 1:
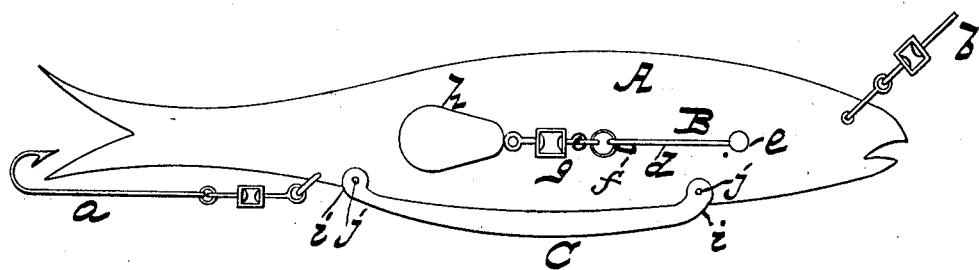
Figure 2:
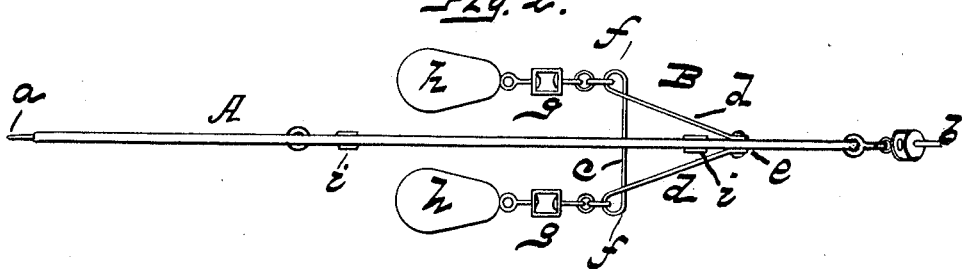
Figure 3:

Figure 1, represents a side view of the artificial bait or minnow. Fig. 2, is a top or plan view of the same and Fig. 3, is a perspective view of the sinker, detached from the fish.

Referring by letter to the accompanying drawing, A, designates the artificial bait, which is constructed of metal, or other suitable material, and in the form of a fish, a minnow preferred, and of any desirable size or shape, which is provided with the usual fish hook $a$, and line $b$, both of which being swiveled to the body in the usual manner.

B, designates a spreader or triangular frame comprising the transverse bar $c$ made rigid about its center to the body of the fish, while the two oblique bars $d$, $d$, extend forward and come together at their extreme ends where they are firmly secured to the body, as at $e$. This triangular spreader is provided with eyes $f$, $f$, and with the transverse bar and oblique bars the whole is formed integral. To these eyes, on each side of the body of the minnow, are connected the swivels $g$, $g$, that is provided with a lure or attracting plates $h$, $h$, that spin when the bait is drawn through the water by the fisherman.

C, represents a detachable sinker, having at opposite ends upturned lugs $i$, $i$, that are transversely perforated to receive pins $j$, $j$, that also pass through similar perforations in the body of the fish, thereby securing the sinker to the body.

It will be observed from the above description, when taken in connection with the accompanying drawing, that by the novel and peculiar construction of the spreader the lures are spread apart and are prevented from coming in contact with the sides of the body while rotating, thus leaving them free and without any interference, at the same time by means of the peculiar construction of the spreader or triangular frame, a yielding or springing movement is provided for the lures, thus preventing jarring or shock to said lures while being drawn through the water where there may be obstructions, such as weeds and the like and an artificial bait as herein described is durable, can be made ornamental, as well as cheap to manufacture.

Having thus described my invention, what I claim and desire to secure by Letters Patent is—

The combination with an artificial fish and side lures, of the triangular member comprising the side bars having at their forward ends eyes, a transverse bar having at each end an eye, said transverse bar rigidly secured to the body of the artificial bait at its center and a pin passing through the eyes at the forward end of each side bar and the fish, said transverse bar and side bars and the eyes thereof, formed of a single piece, substantially as described.

In testimony whereof I affix my signature in presence of two witnesses.

FRANK A. STAPLES.

Witnesses:
 HERMAN KROGER, Jr.,
 PAUL C. SPERLING.

---

Copies of this patent may be obtained for five cents each, by addressing the "Commissioner of Patents, Washington, D. C."